United States Patent [19]

Koschier

[11] 4,141,212
[45] Feb. 27, 1979

[54] DIFFERENTIALLY GEARED REGENERATIVE REVERSE FLOW TURBO SHAFT ENGINE

[75] Inventor: Angelo F. Koschier, Shelton, Conn.

[73] Assignee: Avco Corporation, Stratford, Conn.

[21] Appl. No.: 808,263

[22] Filed: Jun. 20, 1977

[51] Int. Cl.² .......................... F02C 3/10; F02C 7/10
[52] U.S. Cl. .......................... 60/39.16 R; 60/39.51 R
[58] Field of Search .................. 60/39.16 R, 39.16 C, 60/39.16 S, 39.33, 39.51 R, 39.51 H; 415/115, 117, 143, 189

[56] References Cited

U.S. PATENT DOCUMENTS

| | | | |
|---|---|---|---|
| 2,654,565 | 10/1953 | Feilden | 415/143 |
| 3,100,378 | 8/1963 | Austen et al. | 60/39.16 S |
| 3,154,918 | 11/1964 | Kronoyard | 60/39.16 S |
| 3,452,542 | 7/1969 | Saferstein et al. | 415/117 |
| 3,842,595 | 10/1974 | Smith et al. | 415/189 |
| 4,030,288 | 6/1977 | Davis et al. | 60/39.51 R |

FOREIGN PATENT DOCUMENTS

| | | | |
|---|---|---|---|
| 1221850 | 7/1966 | Fed. Rep. of Germany | 60/39.51 H |
| 883530 | 11/1961 | United Kingdom | 60/39.51 H |

*Primary Examiner*—Louis J. Casaregola
*Attorney, Agent, or Firm*—Ralph D. Gelling

[57] ABSTRACT

A gas turbine engine is constructed having a forward differentially geared power output with an adjacent inlet for the introduction of airflow to the engine. After the airflow is compressed, it is discharged into an annular regenerator which is heated by exhaust gases. A reverse flow can-type combustor is located within the annular regenerator and receives the preheated air therefrom. The exhaust gas from the combustor is directed forward, first, to the power turbine and then to the gasifier turbine, after which it is exhausted through the regenerator.

13 Claims, 3 Drawing Figures

DIFFERENTIALLY GEARED REGENERATIVE REVERSE FLOW TURBO SHAFT ENGINE

BACKGROUND OF THE INVENTION

The purpose of this invention is to construct a unique combination of elements in a gas turbine engine in order to maximize fuel economy, part power performance, and ease of maintenance. Gas turbine engines are most economical when they are run at full power and, therefore, maximum inlet temperature. Problems in economy arise, however, when a gas turbine engine must be run at less than the full power condition. This problem is most significant when the engine is used in a land vehicle as opposed to an aircraft. Fuel economy can be enhanced during the part power operation through the use of an exhaust gas regenerator to preheat the airflow entering the combustor. It is, therefore, an object of this invention to utilize an exhaust gas regenerator in as simple a manner as possible.

Pollution reduction and economy is promoted by accurate control of the fuel to air ratio in the combustor. This can best be accomplished by the use of a can-type combustor, and it is, therefore, an object of this invention to utilize this type of combustor.

To further increase the part power performance and, also, fuel economy, the power output of the engine is taken through a differential gear assembly.

Ease of maintenance is obtained through the use of substantially axial symmetrical elements and the use of a simple can-type combustor. Maintenance is further facilitated by taking the power output from the front of the engine. This tends to isolate the high temperature portions of the engine from the transmission and accessory drive elements. The engine of this invention is also constructed to eliminate heavy containment rings which are generally needed to prevent injury caused by a malfunction in the turbine compartment. In addition, this unique engine will have unlimited flexibility with respect to size both in diameter and length.

It is, therefore, the object of this invention to assemble the most desirable components of a gas turbine engine from the standpoint of fuel economy and performance while arranging and packaging these components to provide simplicity of manufacture and ease of maintenance.

SUMMARY OF THE INVENTION

The gas turbine engine of this invention is provided with a duct which directs airflow from the forward inlet to a compressor from which the pressurized air is radially diffused into an annular regenerator. The airflow is directed rearward where it is preheated in the regenerator through the transfer of heat from the exhaust of the engine. The duct is constructed to take the rearward flowing preheated air and turn it into a forward extending can-type combustor where the air is mixed with fuel and burned to produce a high energy gas stream. The high energy gas from the combustor is directed in the forward direction, first, through a power turbine and then through a gasifier turbine where work is performed and the gasflow drops in pressure and temperature. The gasflow is then exhausted from the turbine compartment over the regenerator duct to provide heat thereto. It is then discharged into the atmosphere. The combustor and turbine compartments are located within the annular regenerator.

Power from the gasifier turbine shaft is transmitted through a spline to the compressor drive shaft. These shafts are constructed with an interior concentric passage through which the power turbine shaft may pass to the front of the engine where it is connected to the differential gear assembly.

DESCRIPTION OF THE DRAWING

This invention is described in more detail below with reference to the attached drawing and in said drawing.

DETAILED DESCRIPTION OF THE INVENTION

Figure 1:
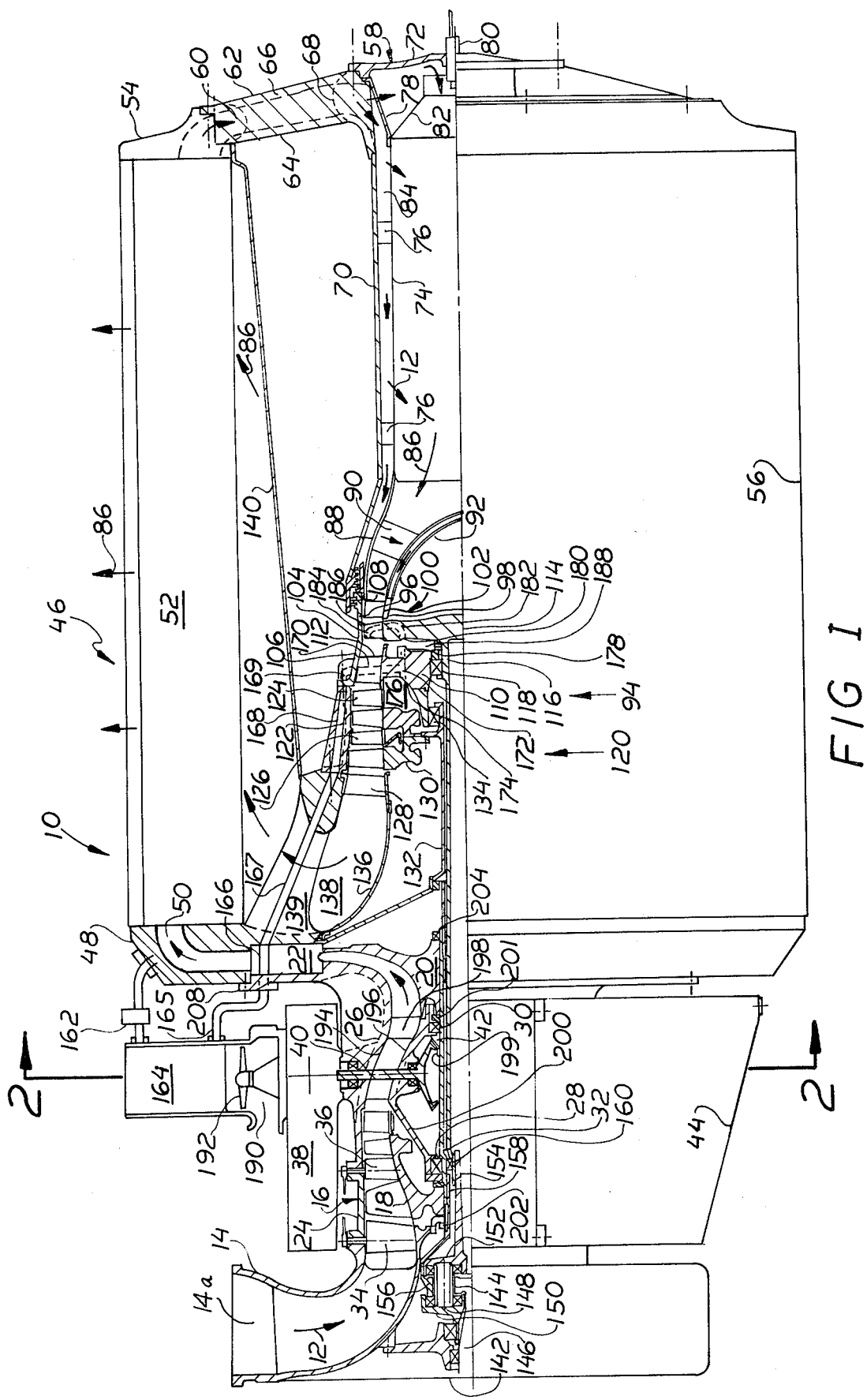
FIG. 1 is a longitudinal view of a gas turbine engine partly in section.
Figure 3:
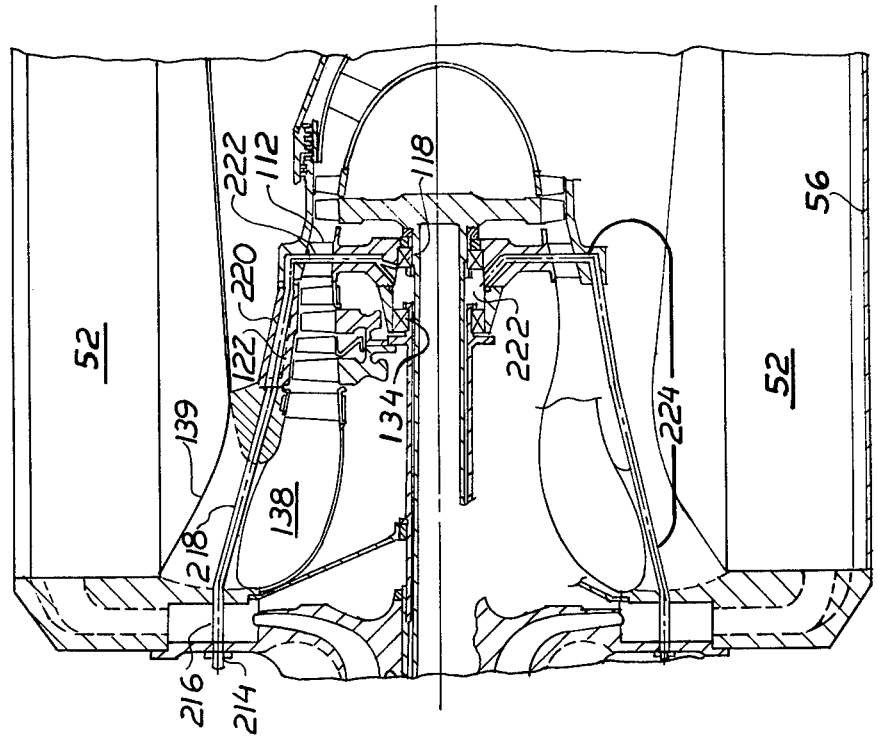
FIG. 3 is a sectional view along the section line 3—3 of FIG. 2 with the horizontal portion of section line 3—3 rotated into a vertical position.

Referring to the drawing, there is shown a gas turbine engine 10 of the turboshaft type. Airflow (indicated by small arrows 12 throughout the engine) enters the engine duct 14 at inlet 14a and is distributed to a compressor 16 rotatably mounted in duct 14 on shaft 32. Compressor 16, as shown, consists of an axial flow impeller 18, and a centrifugal flow impeller 20 which directs the airflow 12 radially into the diffuser section 22 of duct 14.

The portion of duct 14 in which compressor 16 is mounted includes a forward compressor housing 24 and a compressor frame 26. The latter carries the bearings 28 and 30 which journal the hollow compressor drive shaft 32 upon which the compressor impellers are commonly mounted. The attitude of the guide vanes 34 and 36 which are mounted on the forward compressor housing 24 at the inlet of each stage of the axial flow rotor 18 are variable to maintain efficient compressor operation over the entire flow range. Mounted on top of the compressor frame 26 is the accessory drive gear box 38 which has an input shaft 40 driven by a bevel gear 42 fixed on the compressor shaft 32. Mounted at the bottom of the compressor frame 26 is the reservoir 44 for engine oil.

Figure 2:
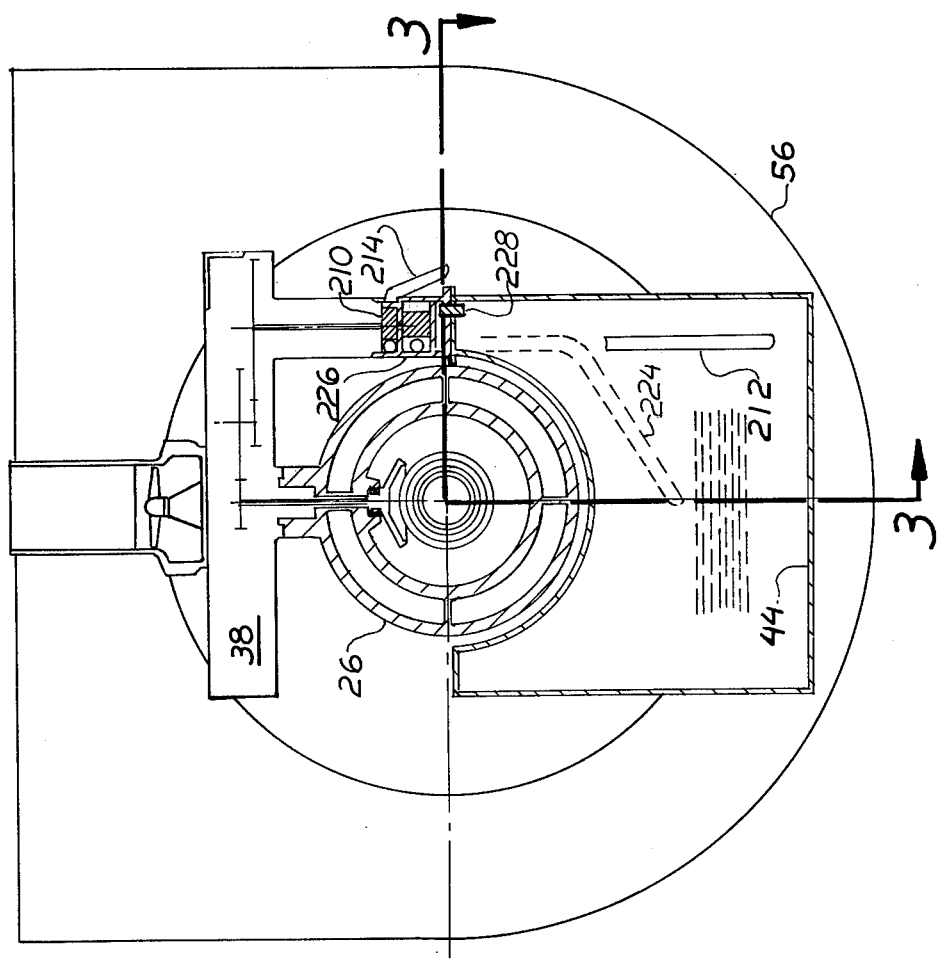
FIG. 2 is a sectional view along the section line 2—2 of FIG. 1.

The compressed and diffused airflow is next preheated in a regenerator portion 46 of duct 14 which is a heat exchanger of the fixed-boundary type, i.e., a recuperator. Upon leaving the diffuser portion 22 of duct 14, the air enters the front header 48 to flow in the channels 50 which distribute the airflow to the forward end of the annular recuperator core 52. The recuperator core 52 is supported between the front header 48 and the rear header 54 which are structurally joined by the U-shaped shell 56 as shown in FIG. 2 surrounding the core 52.

From the recuperator 52 the preheated air next flows in duct 14 to the combustor section 58 which is supported from the rear header 54. The duct 14 in rear header 54 directs the preheated air to the channels 60 in the rear frame 62 formed by joining front wall 64 and rear wall 66 by webs 68. A central opening in the front wall 64 supports a cylindrical combustor housing 70 which defines the combustor section 58 of duct 14. A similar opening in the rear wall 66 is closed by a rear cover plate 72.

A cylindrical combustor liner 74 within which air and fuel are burned is concentrically spaced in the combustor housing 70 by local supports 76 and 78. A fuel nozzle 80 carried by the rear cover plate 72 protrudes into the frusto-conical end 82 of the liner 74. Preheated, compressed air flows from the annular passage 84 around the liner 74 into the liner interior through the liner end 82 and through openings (not shown) in the liner walls thereby providing air for burning the fuel, mixing the resulting hot gas (indicated throughout by larger arrows 86) and cooling the walls of liner 74. The combustor 58 described is well known in the art as the single can type. The discharge end of the liner 74 slip fits into an outer gas guide shell 88 which is connected by hollow struts 90 to a parabolic deflector 92 in which a passage is constructed. The deflector 92 and the shell 88 define a section of duct 14 which directs the airflow 12 to the power turbine nozzle 100 formed by the outer shroud 96 and inner shroud 98.

The gas turning vanes 102 are mounted in the nozzle 100 to direct the airflow to the blades of turbine rotor 114 and have internal passages (not shown) communicating with passages (not shown) in the inner shroud 98 for receiving cooling air. The internal vane passages discharge to the outer surfaces of the vanes 102 providing film cooling as well as convective cooling as is known in the art. The cooling air flows from the annular passage 84 through the struts 90 into the passage of the parabolic deflector 92, through the inner shroud 98 and into the vane passages.

The section of duct 14 immediately following the turbine nozzle 100 is defined by the interturbine frame 106. The power turbine nozzle 100 is supported by bolting not shown its outer shroud 96 to the outer wall 104 of the interturbine frame 106. The outer wall 104 is provided with a sliding seal 108 to the combustor housing 70. The interturbine frame 106 additionally comprises an inwardly extending flange 110 integrally joined to the outer wall 104 by interturbine struts 112.

The bladed power turbine disk 114 is integrally mounted on a shaft 116 which is supported for rotation in the flange 110 of interturbine frame 106 by bearings 118. A two-stage gasifier turbine 120 is mounted for rotation downstream from the power turbine 114 in a section of duct 14 formed by a support sleeve 122. Support sleeve 122 is bolted between the front header 48 and the interturbine frame 106. Vaned nozzles 124 and 126 and a vaned discharge flow straightener 128 are mounted in duct 14 within sleeve 122. The gasifier turbine rotor 126 is fixed on a hollow shaft 132 journaled by bearings 134 retained by the interturbine frame 106. The gasifier turbine shaft 132 is splined to the compressor drive shaft 32 forming a compressor spool. The gas exhausting from the gasifier turbine 120 is turned by a deflector 136 into a passage 138 in the front header 48, which has several angularly spaced webs 139. The gas is then directed by a cylindrical gas guide 140 to the recuperator core 52 while passing over the recuperator core 52, the gas flows between the core 52 and its U-shaped shell 56 and then exhausts at the top into the atmosphere, or, as could be provided into a connecting exhaust duct (not shown).

At the inlet end of duct 14 a central cavity is formed in which a differential gearing 142 is supported. The differential gearing 142 has a sungear 144 with an integral shaft 146 providing a high-speed power takeoff for the engine 10. The sungear 144 meshes with planetary pinions 148 journaled in rotatable fore and aft carriers 150 and 152. The aft carrier 152 has an integral shaft 154 which is splined to the power turbine shaft 116 forming a power spool. The planetary pinions 148 mesh with an internal ring gear 156 having an integral hollow shaft 158 splined to the compressor shaft 32.

An intershaft bearing 160 may be provided to allow the power turbine shaft 116 and the concentric compressor shaft 32 to mutually support each other. These concentric shafts corotate in the particular arrangement described for the differential gearing 142, thereby minimizing the relative speed between the inner and outer races of the intershaft bearing 160 and allowing the bearing 160 to have long operating life. If required, a bumper bearing (not shown) could be utilized between the shafts 116 and 32 because of their low relative speed to limit deflections during critical speed operation.

For maximum braking, if desired, the corotation also permits a clutch (not shown) to be installed to lock the power turbine shaft 116 to the compressor shaft 32 so that the load would drive the compressor 16. During braking, the compressed air would be vented to atmosphere at the compressor exit.

Cooling of the turbines is commonly accomplished with a small flow of compressed air bled from the main engine airflow after the last or an intermediate stage of the compressor. In this engine, for improved performance, the consumption of compressed air for cooling of the bladed rotor in the first stage turbine is kept small by precooling the cooling air and by drawing cooling air only when the turbines are running hottest, which is at high engine power.

Turbine cooling air flows from the compressor diffuser 22, through a control valve 162, to the compressed air side of a cooler 164. External piping 165 directs the cooling air to a passage 166 in front header 48 formed through a solid portion of the air diffuser 22 and then into a passage 167 within one of the several front header webs 139. The cooling air then flows through piping 168 retained in the gasifier turbine support sleeve 122, through a channel 169 in the outer wall 104 of the interturbine frame 106, through passage 170 in one of the interturbine struts 112 and into a channel 172 within the interturbine flange 110. The channel 172 opens to a series of parallel nozzles 174 which discharge cooling air to ventilate the downstream interturbine cavity 176. The channel 172 also feeds a series of swirl nozzles 178 which direct cooling air jets toward a series of apertures 180 in the downstream face of the power turbine disk 114. The apertures 180 are the openings to parallel passages 182 in the disk 114 for ducting cooling air to cooling passages 184 within the blades 186. These blade cooling passages 184 discharge cooling air along the blade surfaces and into the gas stream. The swirl nozzles 178 are oriented at and in the direction of rotation of the apertures 180 in the turbine disk 114 in order to minimize the relative velocity between the issuing jets and the disk 106 so that most of the temperature drop experienced by the cooling airflow during acceleration in the nozzles 178 is preserved upon impinging the disk 114. A small portion of the airflow from the swirl nozzles 178 does not enter the disk passages 182, but ventilates interturbine cavity 188.

The turbine cooling air rejects heat to atmospheric air induced into the involuted duct 190 and propelled through the atmospheric air side of the cooler 164 by a fan 192 which operates only at high engine power when its electromagnetic clutch (not shown) is engaged to an output shaft (not shown) of the accessory gear box 38. The electromagnetic clutch may be controlled by signal from an element sensing one of many possible engine variables, for example, gasifier turbine discharge temperature, power turbine discharge temperature, compressor discharge temperature, compressor speed or fuel flow.

Locating the combustor at one end of an engine allows a single can combustor to be placed with its flow axis in line with that of the turbines. This preserves the inherent capability of a single can combustor to generate hot gas without large local hot spots which are very detrimental to the turbine nozzle vanes downstream. This capability results from several factors: A liner in a single can combustor, having less surface for a given volume than an annular combustor or a multiple can combustor, requires less air for cooling of its surfaces making more air available for mixing of the gas. Only one fuel nozzle need be used, and its spray pattern can be accurately regulated to avoid local overconcentrations of fuel. Moreover, the spray obtainable from the single nozzle can be tailored to produce a desirable temperature pattern such as a hot annular zone in the gas within the combustor. The pattern will persist in the annular turbine channel as a radial gradient with higher temperatures near the center of the channel and cooler temperatures near the walls thereby obviating heavy cooling of the turbine channel walls. Consequently, the turbine cylinders experience lesser and fewer thermal gradients and smaller distortions allowing tight turbine clearances to be maintained for good performance. Finally, the fuel passages in the single nozzle are large and not susceptible to plugging so that heavy (viscous) fuels can be burned as well as light fuels.

In this engine 10, the construction of the compressor 16 when examined in detail reveals a number of advantageous features. The compressor frame 26 is a large structural member which defines most of the compressor sections of the duct 14 comprising an outer wall 194 and an inner wall 196 connected by the intercompressor struts 198. The inner race of the compressor aft bearing 30 is clamped on the compressor shaft 32 between a bevel gear 42 which butts against a shoulder 199 on the shaft 32 and a seal ring 201 which is axially loaded by the centrifugal impeller 20 which in turn is axially loaded by the rearward compressor shaft nut 204. The outer race of the compressor aft bearing 30 is fixed in the inner wall 196 very near the centrifugal impeller 20 and carries both thrust and radial loads. The compressor fore bearing 28 is mounted within the axial flow impeller 18 in a conical extension 200 of the inner wall 196; thus, distributing the support of the compressor drive shaft 32 forward and rearward of the center of a large structural member 26, which also forms the outer wall 194 that shrouds the centrifugal impeller 20 and most of the axial impeller 18, minimizes deflections and thermal distortions which vary the clearances between the impellers and their shrouding walls. This arrangement allows close clearances to be set and maintained for efficient compressor performance.

In the engine 10 described above, the arrangement of the major components, the design of their housings and the grouping of parts into unitary subassemblies permits access to major components without total engine disassembly. Since the main structural elements of the engine are secured by bolts removal of one or two components or subassemblies exposes any of the major components as shown by the following examples: Unbolting the rear cover plate 72 from the rear frame 62 allows removal of the combustor liner 74. Separating the rear frame 62 from the rear header 54 allows the combustor 58 as a unitary subassembly to be withdrawn rearward. Subsequently, unbolting the gasifier turbine cylinder 122 from the front header 48 allows the turbines 94 and 120 to be withdrawn rearward as a unitary subassembly. The differential gearing 142 is accessible from the front of the engine 10. The housing of duct 14 is unbolted from the forward compressor housing 24 to expose the rear of the differential gearing 142 and the forward compressor shaft nut 202. Removal of this nut 202 allows withdrawal of the axial impeller 18. Alternatively, separating the compressor frame 26 from the front header 48 at 208 allows the rearward compressor shaft nut 204 to be removed and the centrifugal impeller 20 to be withdrawn.

The engine 10 has no major longitudinal joints in its outside housings and only a few radial joints, which are more readily sealable, minimizing, thereby, the potential leakage of compressed air or gas and the resulting detriment to engine performance. Most of the major engine parts are axially symmetric which is conducive to low cost fabrication by casting and spinning. The engine differential gearing 142, the accessory gear box 38 and the oil reservoir 44 are located at the front of the engine 10 minimizing adverse exposure to hot parts which are segregated to the rear. Any required transmission (not shown) could be conveniently located adjacent to the engine power takeoff shaft 146 at the front of the engine 10 and desirably remote from the rearward hot section.

In addition, the recuperator core 52 surrounding the turbines 94 and 120 will retain flying fragments should a turbine rotor burst from centrifugal forces. Consequently, no additional precautionary shielding is needed for containment of the hot, rotating section of the engine.

Yet another advantage of this engine 10 is that its arrangement does not restrict enlarging the radial or longitudinal size of any of the major components, namely the compressor 16, the turbines 94 and 120, the combustor 58 or the recuperator 52. The lengths of the compressor drive shaft 32 and the power turbine shaft 116 are not limited by critical speed considerations because of the intershaft bearing 160 and the feasibility of employing bumper bearings as already described.

The oil supplied throughout the accessory gear box 38 for lubrication drains directly into the engine oil reservoir 44 below so that a separate scavenge pump and sump for the gear box are obviated. The accessory gear box 38 contains the oil supply pump 210 which draws from the reservoir 44 through a suction pipe 212 and discharges through piping (not shown) for distributing oil throughout the gear box 38 and through a supply pipe 214 leading to the turbine bearings 134 and 118. The supply pipe 214 connects with an oil passage 216 formed through a solid portion of the air diffuser 22. Continuing from the diffuser oil passage 216, connected in series are a passage 218 through one of the several front header webs 139, piping 220 retained by the gasifier turbine cylinder 122, and a passage 222 through one of the several interturbine struts 112. From the latter passage 222, oil is distributed to the turbine bearings 134 and 118.

The resulting oil froth is withdrawn from the bottom of the scavenge chamber 222 by a series of scavenge passages 224 communicating with a scavenge pump 226 in the accessory gear box. The scavenge passages 224 are contained in the lower portion of the engine 10, but follow a similar route as that already described for the oil supply passages. They are of larger diameter than the oil supply passages to accommodate the larger volumetric flow of oil froth. The froth is discharged through a short pipe 228 into the reservoir 44 where the oil settles out from the entrained air.

The turbine cooling air supply passages, the oil supply passages and the oil scavenge passages are preferably inexpensively provided in the engine housings and casings by casting the housing and casing walls with the passages in situ. Alternatively these auxiliary passages can be machined into the walls. Containing the auxiliary passages within the housing and casing walls obviates the use of external piping which is vulnerable to external damage and adds excess bulk and weight to an engine.

What is claimed as novel and desired to be secured by Letters Patent of the United States is:

1. A gas turbine engine having forward and rear portions comprising:
   a housing having an interior duct through which air may pass, said duct having upstream and downstream portions relative to the direction of airflow through the duct;
   a compressor shaft rotably mounted within the housing, said compressor shaft being constructed with a coaxial interior passage;
   a compressor impeller mounted on the compressor shaft for rotation therewith, said impeller extending into the interior duct to increase the velocity of the air flowing in the duct upon rotation of the impeller, said impeller discharging the airflow radially;
   a forward header secured to the housing downstream of the compressor and having an interior passage forming part of the duct, said interior passage connected to receive the radially flowing air from the compressor and constructed to diffuse said airflow and direct it axially rearward;
   an annularly shaped regenerator mounted in the housing downstream of the diffuser, said regenerator forming part of the duct and being connected to receive the rearward flowing air and also being constructed to transmit heat to said airflow, said regenerator surrounding a radially interior cavity;
   a rear header removably secured to the housing rearward and downstream of the regenerator and having an interior passage forming part of the duct, said interior passage connected to receive the rearward flowing air from the regenerator and direct it radially inward;
   a cylindrical combustion chamber mounted in the housing and extending in the forward direction within the interior cavity of the annular regenerator and constructed to receive the airflow from the rear header passage, said combustion chamber having means to mix fuel with the airflow, and having means to ignite said mixture in order to rapidly heat the airflow, said combustor exhausting the rapidly heated airflow in the forward direction;
   a power turbine shaft rotably mounted within the housing and extending toward the forward portion of the engine through the inner passage of the compressor shaft;
   a power turbine mounted within the regenerator cavity on the power turbine shaft for rotation therewith, said power turbine having blades extending into the interior duct in the path of the heated forward flowing air from the combustor, the airflow exerting a force on said turbine blades to cause rotation of the power turbine shaft;
   a compressor turbine mounted within the regenerator cavity on the compressor shaft for rotation therewith, said compressor turbine having blades extending into the interior of the duct downstream of the power turbine in the path of the heated forward flowing air from the power turbine, the airflow exerting a force on said compressor turbine blades to cause rotation of the compressor shaft;
   a differential gear assembly mounted in the forward portion of the engine and interconnected to the power turbine shaft and the compressor shaft to provide a forward power output to utilize the power imparted to the turbine shaft by the airflow; and
   means for radially exhausting the airflow from the duct downstream and forward of the compressor turbine through the regenerator to provide heat thereto.

2. A gas turbine engine having forward and rear portions as described in claim 1 wherein the combustor, power turbine, and compressor turbine are mounted coaxially with the axis of the annular regenerator.

3. A gas turbine engine as described in claim 1 wherein the compressor shaft is comprised of two sections, a compressor shaft mounted in the forward portion of the engine and a compressor turbine shaft mounted in the rear portion of the engine, said shafts being splined together for mutual rotation.

4. A gas turbine engine having forward and rear portions as described in claim 1 further comprising:
   means to cool the power and compressor turbine elements by the circulation therein of cooled compressed air; and
   control means operatively associated with the cooling means to allow circulation of cooled air only during periods of high operational temperatures.

5. A gas turbine engine as described in claim 2 wherein the compressor comprises:
   an axial flow impeller telescoped on to the forward portion of the compressor shaft and fixed thereon by a forward compressor shaft nut;
   a centrifugal flow impeller telescoped onto the rearward portion of said compressor shaft and fixed thereon by a rearward compressor nut;
   a differential gear assembly mounted in the forward portion of the engine and interconnected to the power turbine shaft and the compressor shaft to provide a forward power output to utilize the power imparted to the turbine shaft by the airflow; and
   means for radially exhausting the airflow from the duct downstream and forward of the compressor turbine through the regenerator to provide heat thereto.

6. A gas turbine engine as described in claim 5 wherein the interior duct of the housing in which the compressor is mounted is formed by a structure comprising:
   a frame secured to the housing and forming a shroud to define the portion of the interior duct about the compressor impellers; said frame being secured to the housing by means which allow the removal of the frame in the forward direction to expose the rearward compressor nut and allow removal of the centrifugal flow impeller; and a journal assembly secured to the frame to receive the compressor shaft for rotary support.

7. A gas turbine engine as described in claim 6 wherein the compressor frame comprises:
an outer wall secured to the forward header, said wall forming a shroud around the compressor impellers and defining a portion of the interior duct of the housing;
an inner frame fixed to the outer wall by struts; and
forward and rear bearing assemblies mounted on the inner frame to support the compressor shaft in manner which distributes the load of said shaft on either side of a center line through said compressor frame.

8. A gas turbine engine as described in claim 6 further comprising an inlet housing secured to the compressor frame, said inlet housing adapted to support the differential gear assembly, said inlet housing being secured to the compressor frame by means which allow the removal of the inlet housing from the compressor frame in the forward direction to expose the rear of the differential gear assembly and to allow access to the forward compressor nut to enable removal of the axial compressor rotor in the forward direction.

9. A gas turbine engine as described in claim 6 further comprising:
an accessory gear box mounted within the exterior profile of the engine on the top of the compressor frame and operatively connected to the compressor shaft; and
a lubricating oil reservoir mounted within the exterior profile of the engine on the bottom of the compressor frame to enable the oil to drain directly from said gear box into said reservoir.

10. A gas turbine engine as described in claim 1 wherein the portion of the interior duct in which the compressor and power turbines are mounted is formed by a structure comprising:
a support cylinder secured to the forward header and forming a shroud about the compressor turbine to define a portion of the interior duct;
a turbine frame secured to the support cylinder and forming a shroud about the power turbine to define a portion of the interior duct, said turbine frame also forming a support for the turbine shaft which is journaled for rotation therein; and
securing means for said support cylinder and said turbine frame which allow the removal of said elements in the rearward direction to allow access to the turbines for removal thereof.

11. A gas turbine engine as described in claim 10 wherein the combustor slidably engages the turbine frame in a sealed relation to form a portion of the interior duct.

12. A gas turbine engine as described in claim 1 wherein the rear header which forms a portion of the interior duct which directs the preheated air to the combustor comprises;
a rear frame removably secured to the regenerator and having a passage for airflow constructed therein, said rear frame having a centrally positioned opening adapted to receive the combustor; and
a cover plate removably secured to the rear frame to close the central opening.

13. A gas turbine engine as described in claim 12 wherein the combustor comprises:
a cylindrical combustor housing mounted in the opening of the rear frame and slidably engaging the turbine frame in a sealed relation to form a portion of the interior duct, said housing being removably secured in place by the cover plate; and
a cylindrical combustor liner coaxially mounted within the combustor housing and position to form a passage for the flow of air between said liner and the combustor housing, said combustor adapted to receive preheated air from the regenerator, and to exhaust super heated combustion airflow to the turbines.

* * * * *

UNITED STATES PATENT AND TRADEMARK OFFICE
CERTIFICATE OF CORRECTION

PATENT NO. : 4,141,212
DATED : February 27, 1979
INVENTOR(S) : Angelo F. Koschier It is certified that error appears in the above—identified patent and that said Letters Patent are hereby corrected as shown below:

Column 8, please delete lines 48 through 57.
Column 8, line 47, ";" should be -- . --.

Signed and Sealed this

Twenty-sixth Day of June 1979

[SEAL]

Attest:

RUTH C. MASON
Attesting Officer

DONALD W. BANNER
Commissioner of Patents and Trademarks